(12) United States Patent
Wilson

(10) Patent No.: US 7,782,980 B2
(45) Date of Patent: Aug. 24, 2010

(54) METHOD AND SYSTEM FOR SIMULCASTING

(75) Inventor: Alan Lee Wilson, Naperville, IL (US)

(73) Assignee: Pine Valley Investments, Inc., Las Vegas, NV (US)

( * ) Notice: Subject to any disclaimer, the term of this patent is extended or adjusted under 35 U.S.C. 154(b) by 812 days.

(21) Appl. No.: 11/726,872

(22) Filed: Mar. 22, 2007

(65) Prior Publication Data

US 2008/0232435 A1    Sep. 25, 2008

(51) Int. Cl.
*H04L 27/04* (2006.01)
(52) U.S. Cl. .................. 375/299; 375/267
(58) Field of Classification Search .......... 375/299, 375/267, 308, 279, 280, 281; 370/204
See application file for complete search history.

(56) References Cited

U.S. PATENT DOCUMENTS

| | | | |
|---|---|---|---|
| 5,239,672 A | 8/1993 | Kurby et al. | |
| 5,347,542 A | 9/1994 | Kurby et al. | |
| 5,377,229 A | 12/1994 | Wilson et al. | |
| 5,541,953 A | 7/1996 | Hiben et al. | |
| 6,567,475 B1 * | 5/2003 | Dent et al. | 375/286 |

* cited by examiner

*Primary Examiner*—Kevin Y Kim
(74) *Attorney, Agent, or Firm*—Fox Rothschild, LLP; Robert J. Sacco

(57) ABSTRACT

A method and system for simulcasting are provided. The method includes modulating a simulcast signal using 8-level modulation, increasing a spacing between signal pulses of the simulcast signal and spreading in time the signal pulses of the simulcast signal. The method further includes communicating a stretched modulated simulcast signal formed by increasing the time interval spacing and spreading in time the signal pulses.

27 Claims, 5 Drawing Sheets

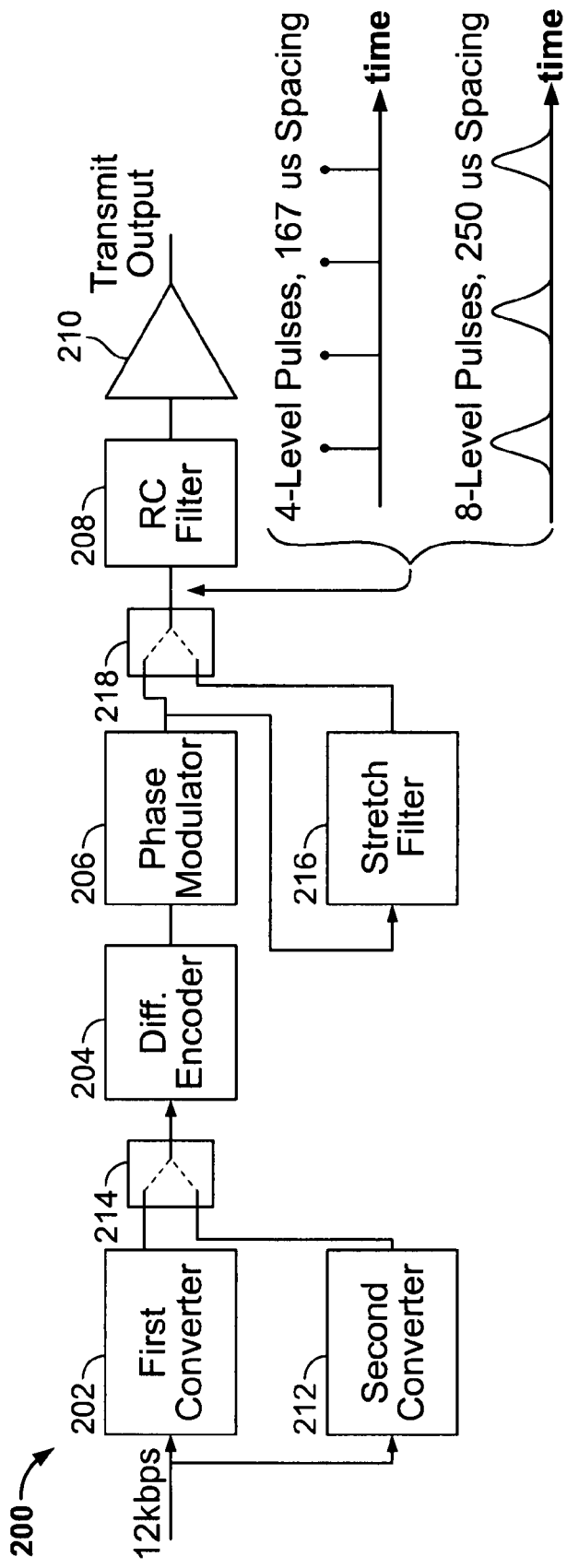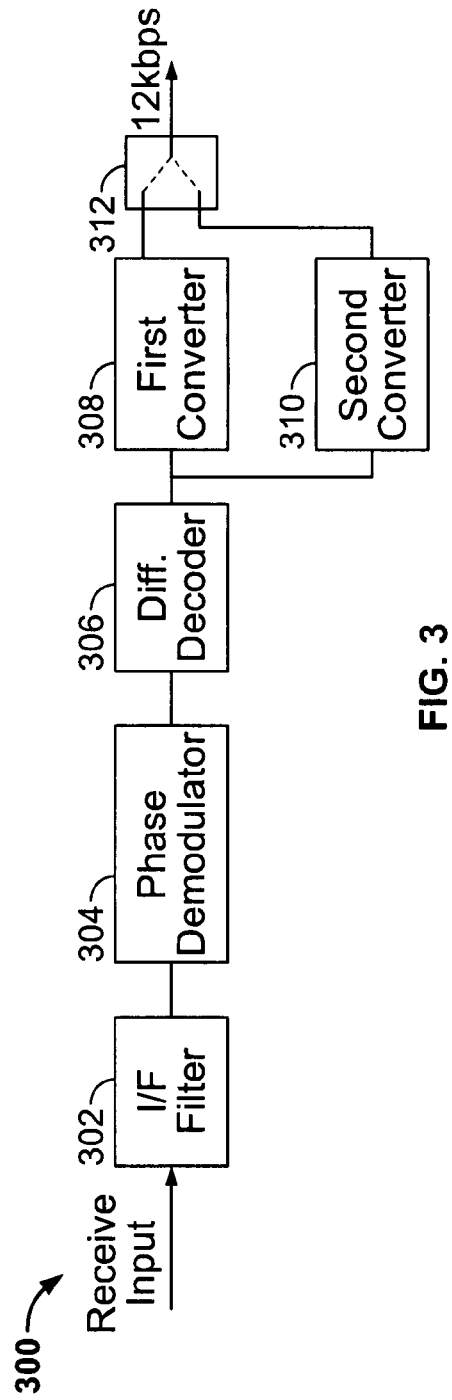
FIG. 2
FIG. 3

Table Mapping Bits to Symbols

500 →

| Di-Bits | 4-Level | Tri-Bits | 8-Level |
|---|---|---|---|
| 01 | +3 π/4 | 010 | +7 π/8 |
| | | 011 | +5 π/8 |
| 00 | +1 π/4 | 001 | +3 π/8 |
| | | 000 | +1 π/8 |
| 10 | -1 π/4 | 100 | -1 π/8 |
| | | 101 | -3 π/8 |
| 11 | -3 π/4 | 111 | -5 π/8 |
| | | 110 | -7 π/8 |
| 502 | 504 | 506 | 508 |

METHOD AND SYSTEM FOR SIMULCASTING

BACKGROUND OF THE INVENTION

This invention relates generally to digital radio systems, and more particularly, to methods for simulcasting or monocasting in digital radio systems, especially private land mobile radio (LMR) systems.

Digital radio communication systems typically use a broad array of different technologies for modulation and demodulation so that information can be effectively transmitted over a radio channel. Radio communications systems have become standardized to facilitate reliable and interoperable communications in a variety of standards. For example, the Project 25 suite of standards (documented by the Telecommunications Industry Association (TIA) in TIA-102.BAAA) and numerous related standards are known. The Project 25 suite of standards provides Frequency Division Multiple Access (FDMA) channels, which are most often on channels spaced 12.5 kilo-Hertz (kHz) apart. The Project 25 standard will likely expand to encompass a Time Division Multiple Access (TDMA) standard that will also fit into channels spaced 12.5 kHz apart (herein referred to as a narrow band channel).

In order to provide extended communication coverage areas, particularly in large private radio systems, such as trunked radio systems in the 800 MHz band, simulcast channels are often implemented. Simulcast transmission, as performed with mobile radio technology, provides for identical modulation schemes to be used to communicate the same information from different locations. For example, the same information is transmitted from two or more sites (e.g., base stations) within a coverage area of the system. This information is transmitted simultaneously, synchronously, and on the same radio channel, so that radio receivers typically receive a signal composed of two or more radio signals that are incident on the receiver antenna. Accordingly, it is important for communications on the TDMA standard for Project 25 to operate reliably and effectively on simulcast channels with 12.5 kHz channel spacing.

The Project 25 suite of standards is intended to operate with digital voice communication such that the suite includes a standardized vocoder to digitize voice for transmission. The vocoder may either operate in a full rate mode, for FDMA transmissions, or a half rate mode, for TDMA transmissions, with the channel separated into two slots, for two simultaneous voice calls. The known Project 25 standards for FDMA channels define a modulation family that includes Compatible 4-level Frequency Modulation (C4FM) and Compatible Quadrature Phase Shift Keying (CQPSK) at a bit rate of 9.6 kbps (as described and defined in the TIA-102.BAAA standard). There are also proposals to define a standard for TDMA channels. The TDMA standard will likely use a half rate voice encoder to scale the bit rate for the voice information by a factor of two. However, the overall bit rate of the channel may need to increase beyond 9.6 kbps to allow a margin for switching times. When providing simulcast communications at bit rates higher than 9.6 kbps using the known communications standards, less than acceptable transmission quality may result. Moreover, the simulcast range when using the known standards at 9.6 kbps also may be less than desired.

The current Project 25 standard includes the measurement of a figure of merit for simulcast operation that is known as the signal delay spread capability, or more simply and often referred to as the delay spread. The signal delay spread capability measures the performance of the receiver when the receiver receives two independently faded signals that are delayed relative to each and which are identically modulated, as would be expected in a simulcast system. The signal delay spread capability measures the maximum delay that the receiver may tolerate while maintaining a usable bit error rate (BER). In the Project 25 standard, the signal delay spread capability is measured according to the TIA-102.CAAA standard in clause 2.1.6.2 and the specification for the delay spread is given in the TIA-102.CAAB standard in clause 3.1.6 at 50 microseconds for 5% BER. Accordingly, it is desirable to improve this performance.

BRIEF DESCRIPTION OF THE INVENTION

In one embodiment, a method for simulcast communication is provided. The method includes modulating a simulcast signal using 8-level modulation, increasing a spacing between signal pulses of the simulcast signal and spreading in time the signal pulses of the simulcast signal. The method further includes communicating a stretched modulated simulcast signal formed by increasing the time interval spacing and spreading in time the signal pulses.

In another embodiment, a method for simulcast communication is provided. The method includes selecting one of a 4-level modulation and an 8-level modulation for modulating a simulcast signal and modulating the simulcast signal based on the selected modulation, wherein a bit rate for the simulcast signal is the same for different modulation types.

In yet another embodiment, a simulcast communication system is provided that includes a transmitter configured to switch between a 4-level modulation mode and an 8-level modulation mode. The simulcast communication system further includes a receiver configured to switch between a 4-level modulation mode and an 8-level modulation mode based on an encoded signal protocol in a simulcast transmission from the transmitter.

BRIEF DESCRIPTION OF THE DRAWINGS

FIG. 2 is a block diagram of a transmitter constructed in accordance with an embodiment of the invention.

FIG. 3 is a block diagram of a receiver constructed in accordance with an embodiment of the invention.

Figure 1:
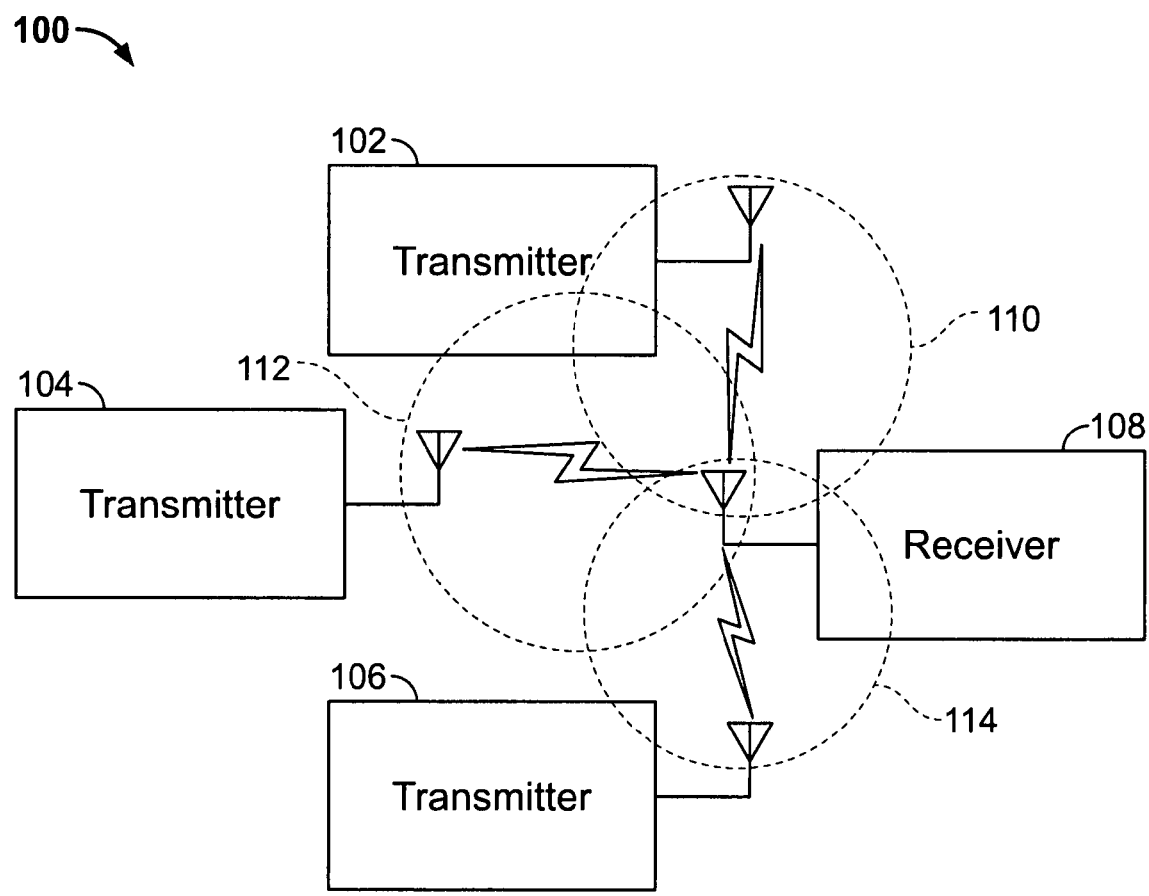
FIG. 1 is a block diagram of a simulcast system in which various embodiments of the invention may be implemented.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or separate hardware. Similarly, any software programs may be stand alone programs, may be incorporated as subroutines in an operating system, may be functions in an installed software package, and the like. It should be understood that the various embodiments are not limited to the arrangements and instrumentality shown in the drawings.

DETAILED DESCRIPTION OF THE INVENTION

For simplicity and ease of explanation, the invention will be described herein in connection with various embodiments thereof. Those skilled in the art will recognize, however, that the features and advantages of the various embodiments may be implemented in a variety of configurations. It is to be understood, therefore, that the embodiments described herein are presented by way of illustration, not of limitation.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of the invention provide a method of stretching the pulse width of a simulcast signal so that the delay spread is increased for improved system coverage and delivered audio quality. As described in more detail below, the "stretching" of the pulse width occurs when using an 8-level modulation scheme such as 8PSK, while maintaining the same bit rate as a 4-level modulation scheme such as quadrature phase-shift keying (QPSK), which is also known as 4PSK, but stretching the symbol time. The switch from a four level signal to an eight level signal may be controlled using a signal protocol to coordinate the transition in a TDMA system. For example, in a trunking system a control channel is used for requesting service by subscriber radios and sending channel assignments to the radios in order to engage a call to communicate voice or other information. The control channel is one instance of a signal protocol and may include information in the channel assignment to indicate, for example, that the 8-level modulation scheme is to be used in the slot assigned to the call.

Various embodiments of the invention may provide simulcast transmissions using a plurality of transmitters. For example, as shown in FIG. 1, a wireless communication system 100 providing simulcast transmissions generally includes a plurality of transmitters 102, 104, and 106, and one or more receivers, 108. The signal received by the receiver 108 is comprised of a summation of signals from the simulcast transmitters as is known. The plurality of transmitters 102, 104, and 106 may be part of one or more base stations and/or communication towers/sites (not shown) and the receiver 108 may be part of a land mobile radio (LMR) unit, which may be a mobile or fixed unit. Each of the plurality of transmitters 102, 104, and 106 have a corresponding communication coverage area 110, 112 and 114, respectively. The communication coverage areas 110, 112 and 114 may overlap in some regions and together define a system coverage area.

In operation, the radio propagation path from the one or more of the plurality of transmitters 102, 104 and 106 to the receiver 108 depends on the location of the transmitter 102, 104 or 106 and the receiver 108. The propagation delays will also be dependent on the geographic locations of the transmitter(s) 102, 104 or 106 and the receiver 108. In one embodiment of a wireless communication system 100 providing simulcast operation, the transmitters 102, 104 and 106 are located at fixed locations and the receiver 108 is mobile, such that the receiver 108 can move within the coverage areas 110, 112 and 114 of the transmitters 102, 104 and 106, respectively. Accordingly, the propagation delays from the transmitters 102, 104 and 106 to the receiver 108 are variable over a range of times determined by the size of the coverage areas 110, 112 and 114. A system coverage area may be, for example, a county in a state in the United States, such that the system coverage area encompasses more than a thousand square kilometers (several hundred square miles). In such a coverage area, and for example, the propagation distance can be up to 100 kilometers (60 miles) and the propagation delay can be about 330 microseconds. The difference in propagation delays between nearby communication sites within such a large coverage area can be 100 microseconds or more. Thus, a large delay differential results.

One embodiment of a transmitter 200 is shown in FIG. 2. Although the transmitter 200 is described as operating at a bit rate of 12 kilobits per second (kbps), the transmitter may operate at other bit rates. For example, the transmitter 200 may operate at 9.6 kbps if desired or needed, such as, when communicating using the Project 25 suite of standards. The transmitter 200 receives an input stream of data, for example, a 12 kbps stream of data that is communicated to a first converter 202 (e.g., a binary 2 bit to M-level converter, where M=4) and to a second converter 212 (e.g., a binary 3 bit to M-level converter, where M=8). If implemented in software, then routine is run using one of the two converters 202 or 212 based on the type of conversion to be performed, for example, converting to 4-level symbols (with 2 bits) using the first converter 202 or converting to 8-level symbols (with 3 bits) using the second converter 212. The mapping from bits to symbols is described below in connection with FIG. 5. Depending on the transmit mode, either the 4-level symbols or the 8-level symbols are selected by a switch 214. It should be noted that in a hardware implementation the switch 214 may be provided before the first and second converters 202 and 212 such that the 12 kbps stream of data is only communicated to one of the first and second converters 202 and 212 based on, for example, the modulation scheme to be used. Also, a single converter alternatively may be provided with two modes of operation.

The symbols are then differentially encoded by a differential encoder 204. Differential encoding refers to the cumulative sum of the phase angles represented by the 4-level or 8-level symbols. In software, such as MATLAB®, which is available from MathWorks, Inc., the differential encoding may be performed using a "cumsum" function on the vector representing the symbols.

The data at the output of the differential encoder 204 represents carrier phase angles. This output is then converted to a complex carrier wave signal by a phase modulator 206. The phase modulator 206 is represented as a complex exponential function, but it should be appreciated that there are various other ways to obtain phase modulation as described in the TIA-102.BAAA standard. The output of the phase modulator 206 is a sequence of pulses, spaced according to the symbol rate. For example, for 12 kbps 4-level pulses, the pulses are spaced 166.667 microseconds apart. For 12 kbps 8-level pulses, the pulses are spaced 250.000 microseconds apart. It should be noted that the time values scale inversely with the bit rate, such that the values are approximately 20% longer for 9.6 kbps. For example, for 9.6 kbps 4-level pulses, the pulses are spaced 208.333 microseconds apart. It should be noted that the pulses include complex values, which may be of unit amplitude and variable phase angle, where the phase angle represents the phase modulation signal. As used herein and as illustrated in FIG. 2, the converter 212 provides 8-level pulses that are spaced further apart (250 microseconds (µsec)), or stretched, in time relative to the 4-level pulses (167 µsec).

Figure 4A:
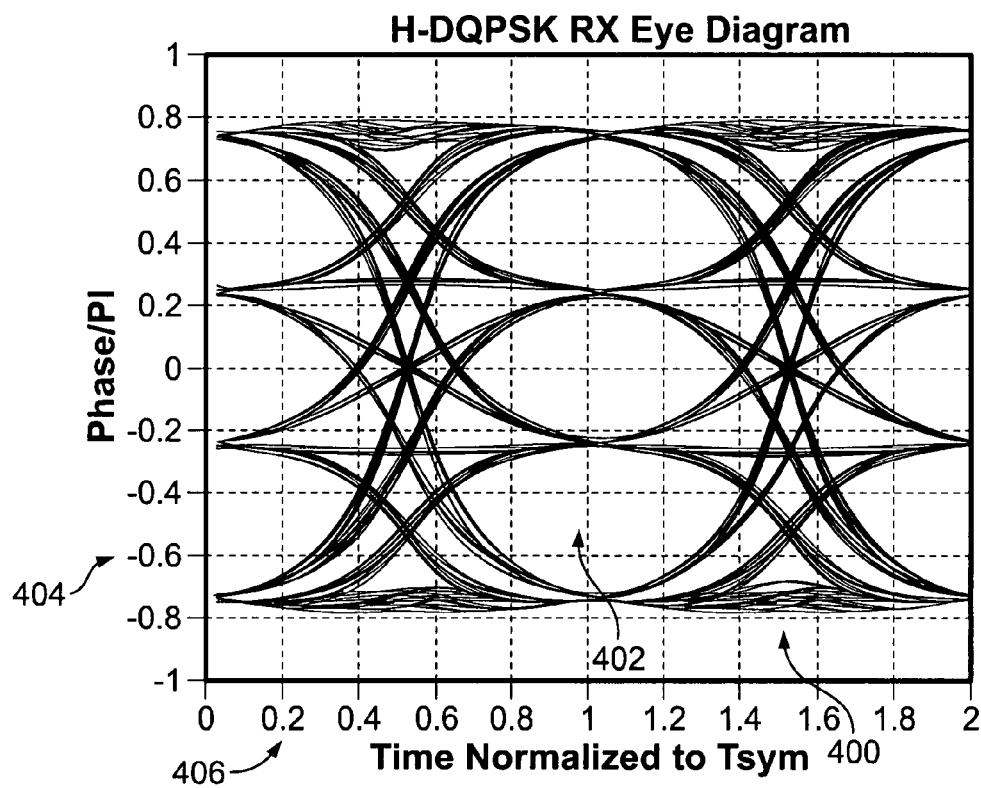
FIG. 4A is a diagram illustrating an eye pattern for QPSK modulation in accordance with an embodiment of the invention.
Figure 4B:
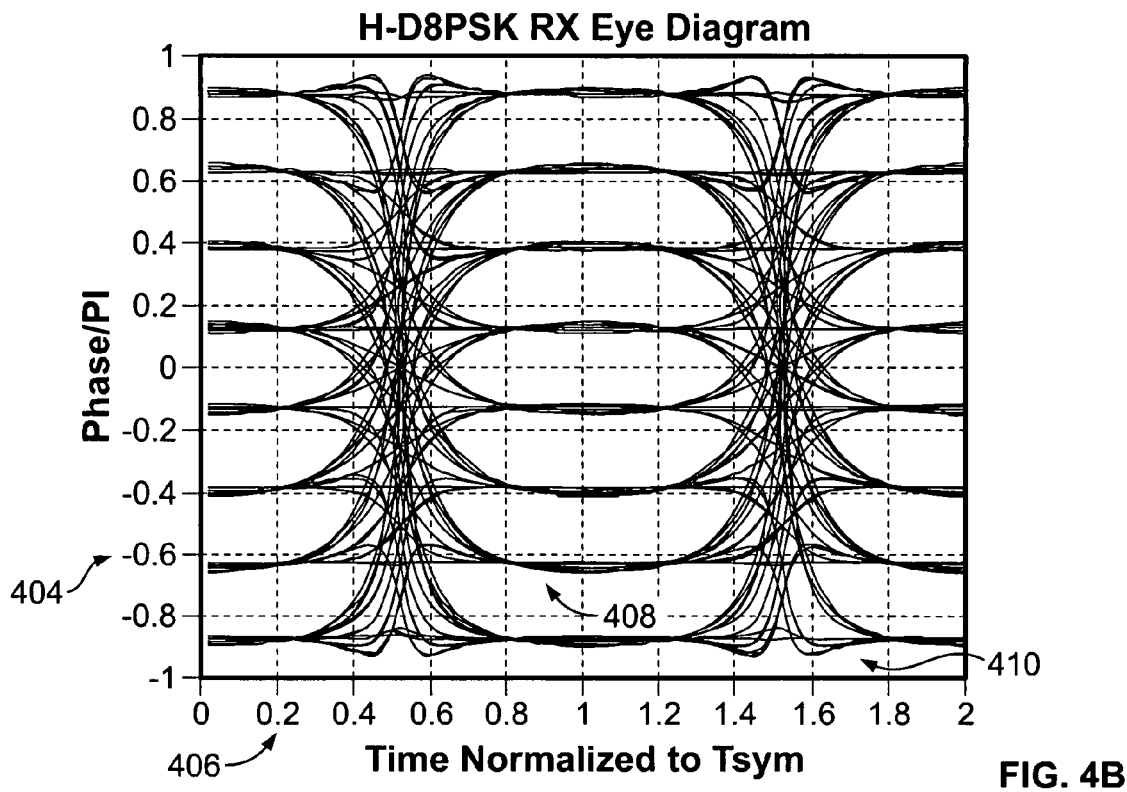
FIG. 4B is a diagram illustrating an eye pattern for 8PSK modulation with a stretched pulse for simulcast in accordance with an embodiment of the invention.

Moreover, with respect to 8-level pulses, the output from the phase modulator 206 is provided to a stretching filter 216 (also referred to as a stretch filter). The stretching filter 216 modifies, and more particularly, stretches out or dilates the pulse (as described in more detail below) to extend the pulse duration. This stretched or dilated pulse contributes to the stretched modulated simulcast signal to make the eye opening (as shown in FIG. 4B) have a longer time duration and a smoother boundary between the different phase transitions. The stretching filter 216 stretches or dilates the individual 8-level pulses (e.g., increases the width of the pulses) relative to the 4-level pulses (see FIG. 2). For example, the 4-level pulses are at discrete points in time while the 8-level pulses take a Gaussian curve form.

The output of the either the phase modulator 206 (e.g., 4-level output) or the stretching filter 218 is filtered in a raised cosine (RC) filter 208, which results in a smoother output. One example of a stretching filter 216 that may be used is a Gaussian impulse filter with a time constant of 37.5 microseconds. In this embodiment, the impulse time response of the stretching filter 216 is represented as follows:

$$h(t) = g \exp(-0.5(t/\tau)^2) \quad (1)$$

wherein g=gain constant of the filter and τ=time constant of the filter.

Because the time constant, τ, is small relative to the symbol spacing (0.15=37.5 microseconds/250 microseconds), the design can be contained within a time interval of −3 τ to +3 τ. It should be noted that other stretching filters or filter functions for the stretching filter 216 may be used. For example, a square pulse filter, triangular pulse filter, unit impulse filter, or raised cosine filter, among others, may be used. The gain constant, g, is scaled in the stretching filter 216 to obtain the desired carrier amplitude at the output of the RC filter 208. The gain constant, g, does not significantly affect the phase shift of the modulation.

Thus, in operation, if the transmitter 200 is operating to transmit data according to the 4-level modulation scheme, the output of the phase modulator 206 includes 4-level pulses selected by a switch 218 to be output to the RC filter 208. After being filtered by the RC filter 208, the signal is a representation of a continuous time carrier wave that may be amplified for transmission by an amplifier 210. It should be noted that the data of the 4-level modulation scheme is not modified by the stretch filter. The RC filter 208 may be any of a variety of filters, for example, as defined in the TIA-102.BAAA standard. In one embodiment, for 12 kbps transmissions, the RC filter 208 is a raised cosine filter with a designed 6 dB corner frequency set to 3.6 kHz (instead of the more typical value of 3.0 kHz) to match the Nyquist criterion associated with 6 kilo-symbols per second (ksymbol/s) obtained for 12 kbps and 4-level symbols.

It should be noted that the excess bandwidth ratio, α, is set to 1.0 in one embodiment. Further, it should be noted that the parameters of the RC filter 208 may be adjusted to fit other channel bit rates or constraints as is known in the art.

The RC filter 208 obtains the necessary specifications for bandwidth limits as set by standards and regulations for the radio channel in use. For example, in the case of TIA-102.BAAA with the radio channels in the 746 MHz to 806 MHz frequency band, the RC filter 208 attenuates the signal 40 dB or more in an adjacent channel that is 6.25 kHz wide and offset 9.375 kHz center-to-center, relative to the operating channel of the transmitter 200. This can be obtained with an RC filter 208 implemented with a Finite Impulse Response (FIR) filter design using a raised cosine filter shape set to a time interval of −5 $T_{symbol}$ to +5 $T_{symbol}$, where $T_{symbol}$ represents the symbol time of 166.667 microseconds for 12 kbps and 4-level modulation. In other bands, and in other regulations, the limits are set differently as is known in the art. Once the design of the RC filter 208 meets the specified performance with the 4-level modulation scheme, the RC filter 208 also will be able to meet the same specification with the 8-level modulation scheme, such that the same RC filter 208 may be used in connection with the 8-level modulation scheme.

The cascade connection of the stretching filter 216 with the RC filter 208 smoothes the eye opening of the differential phase signal at the transmitter output or its complement in a receiver. FIG. 4A shows, for the 4-level modulation scheme, an example of a differential phase eye pattern 400 (representing phase shift as a complex value) that would be obtained at the output of the transmitter 200 by extracting the phase angle of the carrier and then subtracting with the carrier phase angle at one symbol time ($T_{symbol}$) in the past (e.g., at a previous time) to obtain a phase difference. For 4-level signals, the phase difference will converge to phase angles of +3π/4 +π/4 −π/4 or −3π/4 radians, which is shown in FIG. 4A, where the vertical scale 404 has been adjusted by a factor of π radians, to yield values in the range −1 to +1. It should be noted that the symbol spacing in FIG. 4A is 166.667 microseconds (as measured across the horizontal scale 406, which is a normalized time), and the eye opening 402 is about 118 microseconds when measured directly across the center on the 0 line for phase difference.

The eye opening 408 of the stretched 8-level simulcast modulation 410 is shown in FIG. 4B. As shown, there are 8 levels instead of 4 levels, and the levels take values of +7π/8 +5π/8 . . . −7π/8 radians. The symbol time is now 250.0 microseconds and the eye opening 408 has expanded to about 191 microseconds when measured directly across the center on the 0 line for phase difference. It should be noted that this increase in the eye opening (from 402 to 408 in FIGS. 4A and 4B, respectively) translates to a direct increase in the simulcast delay spread that may be used, for example, by the Project 25 suite of standards for narrow band channel communications. It should be noted that the simulcast delay spread achieved by the various embodiments is about 170 µsec at a 5% BER.

A receiver 300 constructed in accordance with one embodiment of the invention is shown in FIG. 3. The receiver 300 is configured to receive a signal, for example, through a sequence of antennas, amplifiers, mixers, and other devices (not shown) that are known in the art and which may be of different types. The received signal is filtered by an Intermediate Frequency (I/F) filter 302 to limit the bandwidth of the received signal and to exclude out of band signals. For digital radio applications, the I/F filter 302 may be provided as a digital I/F filter implementation. The I/F filter 302 excludes signals in the adjacent channel and minimally attenuates the desired signal modulated by the transmitter 200 (shown in FIG. 2). One example of an I/F filter 302 for a 12 kbps system includes a square root raised cosine FIR filter using an excess bandwidth ratio of α=0.7, and a 3 dB corner frequency of 3 kHz away from the carrier frequency. The equivalent noise bandwidth of such a filter is 6000 Hz. The filter obtains approximately 0.5 dB of insertion loss for the desired signal modulated by the transmitter 200 and attenuates an adjacent channel by about 70 dB.

The output of the I/F filter 302 is converted to a phase signal by a phase demodulator 304. The phase demodulator 304 is represented by a log function to complement the exponential representation of the phase modulator 206 of the transmitter 200 (both shown in FIG. 2). In MATLAB® software, the signal can also be converted with the angle function or a 4-quadrant arc tangent function. This phase signal is then differentially decoded by the differential decoder 306. The differential decoder 306 delays the signal by one symbol time ($T_{symbol}$), takes the phase difference, and converts this modulo $2\pi$ to a phase angle in the range $-\pi$ to $+\pi$ radians. This decoding is known in the art and described, for example, in the TIA-102.BAAA standard. In the various embodiments, and for example, the symbol time is selected to be 166.667 microseconds for the 4-level modulation scheme or 250.000 microseconds for the 8-level modulation scheme. The differential phase angle is illustrated in FIG. 4A for the 4-level modulation scheme or FIG. 4B for the 8-level modulation scheme. In the 4-level modulation scheme, and in one embodiment, the signal is sampled in the center of the eye pattern 402 or 408 (time value 1 in FIGS. 4A and 4B, respectively) and then rounded to the nearest 4-level or 8-level value, which would be an odd multiple of $\pi/4$ radians for 4-level or $\pi/8$ radians for 8-level. This multi-level signal is then converted back to bits by the converter 308 (e.g. M-level to binary (2 bit) conversion, where M=4) for the 4-level modulation scheme or the converter 310 (e.g. M-level to binary (3 bit) conversion, where M=8) for the 8-level modulation scheme. The output of the converter 308 or the converter 310 (at 12 kbps) is selected by a switch 312 according to whether the receiver 300 is in 4-level mode or 8-level mode. Alternatively, the switch 312 may be provided at the output of the differential decoder 306 and switch the output of the differential decoder 306 between the first and second converters 308 or 310.

It should be noted that when using 8-level modulation a signal alternatively may be processed by the second converter 212 and not both the second converter 212 and the stretching filter 216. Accordingly, the output of the phase modulator 206 is provided to the RC filter 208 and not the stretching filter 216. The eye opening, however, may include ripples, which are otherwise smoothed by the stretching filter 216.

Figures 5, 6:
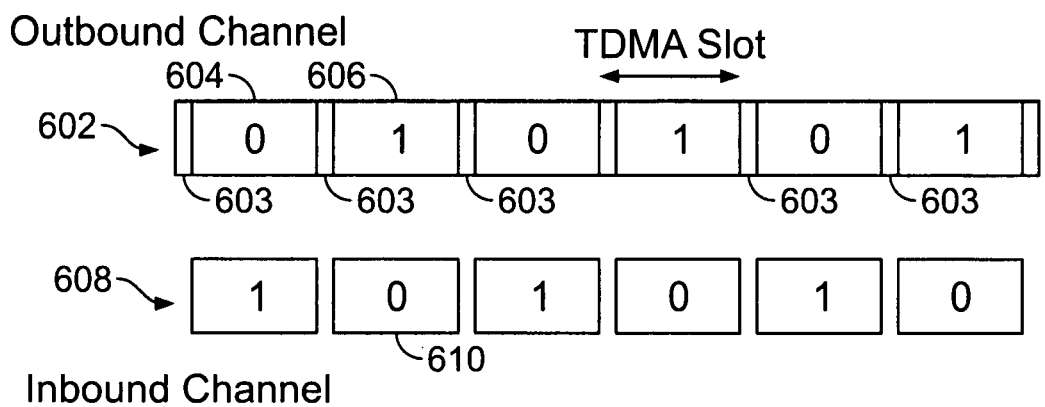
FIG. 5 is a table illustrating the mapping of bits to symbols in accordance with an embodiment of the invention.
FIG. 6 is a diagram illustrating the arrangement of TDMA slots and the transmit bursts within the slots in accordance with an embodiment of the invention.

FIG. 5 illustrates one embodiment for the mapping of bits to symbols. In the table 500, the left two columns 502 and 504 show how pairs of bits called di-bits are converted to 4-level symbols, namely converted to a 4-level phase shift. The right two columns 506 and 508 show how triplets of bits called tri-bits are converted to 8-level symbols, namely converted to an 8-level phase shift. It should be noted that the 8-level mapping (i.e., columns 506 and 508) is arranged so that the left bit and middle bit of each tri-bit match closely to the nearest phase shift level for the 4-level mapping (i.e., columns 502 and 504). Because the Bit Error Rate (BER) in the receiver 300 (shown in FIG. 3) in the presence of noise is proportional to the transitions of the symbol mapping, this mapping means that the BER for both bits in the 4-level modulation are the same. For the 8-level modulation, the BER for the left most bit and the middle bit is about half of the BER for the right most bit in each tri-bit. It should be noted that the di-bits and tri-bits may be gray coded as is known to reduce transmission errors.

FIG. 6 illustrates information that is sequentially transmitted in time by a TDMA system for the Project 25 suite of standards. It should be noted that the inbound channel is the uplink from the subscriber to the infrastructure and is illustrated by the transmission sequence 608. In the TDMA system, this channel is shared by two subscribers that alternate with bursts. The numbers 0 or 1 represent TDMA sub-channel 0 and TDMA sub-channel 1, respectively. In one embodiment, the bursts for the TDMA sub-channels are spaced every 30 milliseconds, shown as the TDMA slot in FIG. 6. Because the inbound TDMA bursts have to fit within this slot time with some allowance for propagation delays and ramp times for the amplifier 210 (shown in FIG. 2) to transition between zero power and full power, the inbound data bursts are smaller than 30 milliseconds. In one embodiment, the inbound data bursts are about 28 milliseconds in duration, leaving 2 milliseconds for a nominal spacing between the bursts. The inbound channel is not a simulcast channel and accordingly is not described in detail.

The transmission sequence 602 shows the outbound channel that can be simulcast in accordance with various embodiments of the invention. It should be noted that the outbound channel is the downlink from, for example, the transmitters 102, 104 and 106 to the receiver 108 (all shown in FIG. 1). The outbound channel is continuously transmitted, with bursts for TDMA sub-channels 0 and 1 alternating as shown. Between the bursts for each TDMA sub-channel is an inter-slot signaling channel (ISCH) 603. The TDMA burst for sub-channel 0 is shown as block 604. Following block 604 is another ISCH 603 and then the TDMA burst for sub-channel 1, shown as block 606. The transmission sequence 602 then repeats. In one embodiment, the outbound TDMA sub-channels have the same time duration as the inbound TDMA sub-channels, such that the time duration of the ISCH 603 is the same as the allowance for propagation delays and ramp times for the inbound channel. Accordingly, in one embodiment, the time duration of the ISCH 603 is 2 milliseconds, which in this embodiment allows the transmission of 24 bits at 12 kbps.

The protocol to control the simulcast modulation selection, for example, between 4-level modulation and 8-level modulation can be signaled using the ISCH 603 (e.g., a modulation selection control command) or on a TDMA control channel as defined in Project 25 suite of standards, such as standard TIA-102.AABB and TIA-102.AABC. When using the ISCH 603 for modulation selection signaling, the protocol may include, for example, a code word that is transmitted with QPSK modulation, but coded to be decodable even in a simulcast condition. In one embodiment, a (2,1,2) repetition code may be used, where each symbol is transmitted twice, adjacent in time, so the code word symbols are effectively doubled in time duration.

Figure 7:
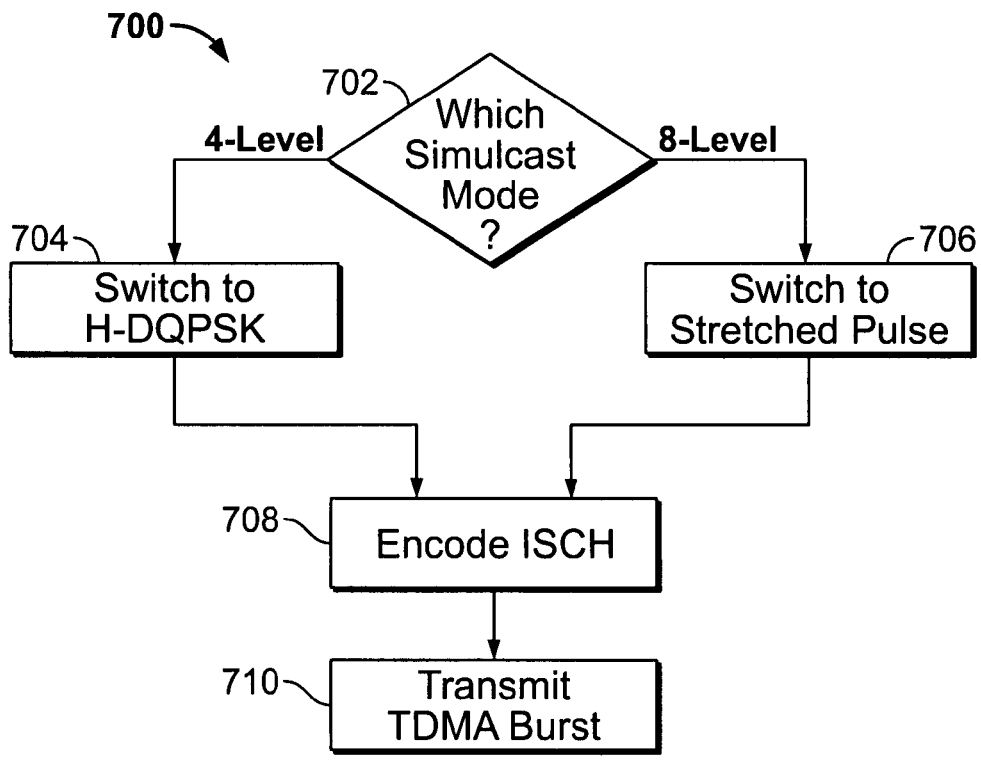
FIG. 7 is a block diagram illustrating a transmitter protocol using simulcast stretched pulse modulation in accordance with an embodiment of the invention.
Figure 8:
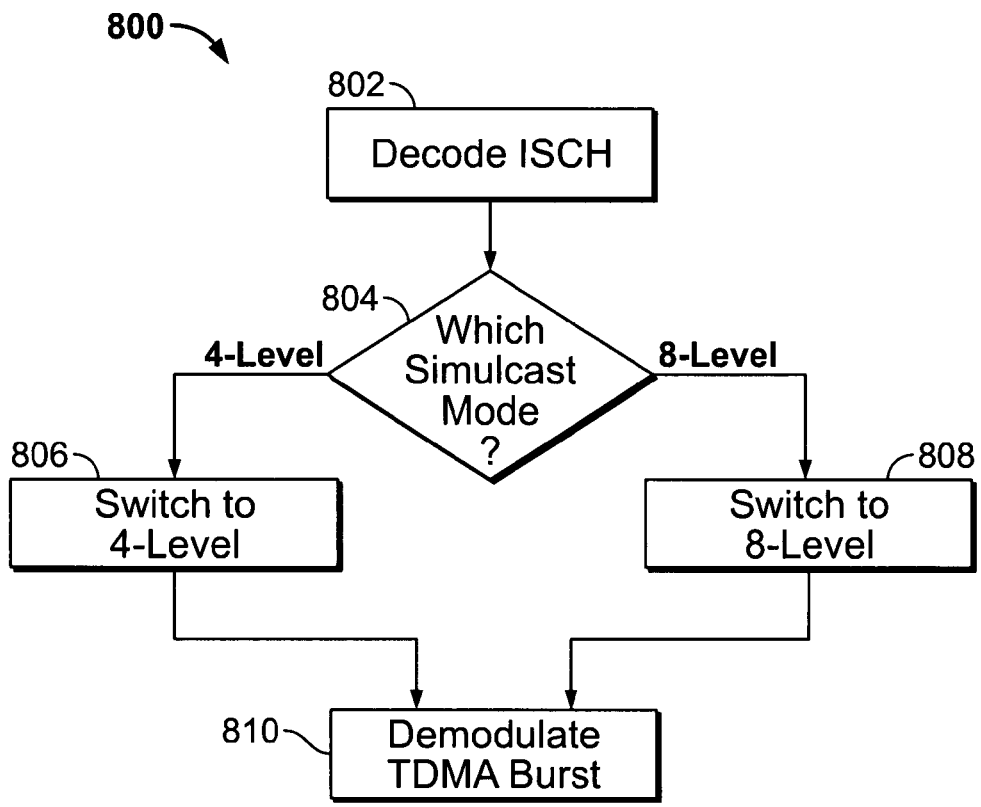
FIG. 8 is a block diagram illustrating a receiver protocol using simulcast stretched pulse modulation in accordance with an embodiment of the invention.

The various embodiments include protocol procedures, as illustrated in FIGS. 7 and 8, to switch between 4-level modulation and 8-level modulation modes of operation. A transmitter protocol 700 is shown in FIG. 7. The protocol 700 determines the type of simulcast mode to use at 702, for example, a determination is made as to whether simulcast stretch pulse modulation is to be used. This determination may be based on the type of communication, the current operating conditions of the system, etc. Thereafter, if the 4-level modulation scheme (non-stretch pulse modulation) is to be used, then the transmitter 200 is switched to a 4-level modulation mode at 704, for example, harmonized differential quadrature phase shift keying (H-DQPSK). The type of transmission protocol to be used may be based on the application, system, transmission requirements, etc. If instead, a determination is made that the 8-level modulation scheme is to be used, then the transmitter 200 is switched at 706 to an 8-level modulation mode, such as the stretched pulse modulation as described herein, and to operate during the TDMA burst with 8-level modulation. After the switch, the transmitter 200 (shown in FIG. 2) encodes the ISCH 603 (shown in FIG. 6) at 708 to identify the modulation scheme determined at 702. The protocol proceeds to 710 to transmit the burst with the selected modulation. After the burst has been transmitted, the procedure can repeat. It should be noted that the protocol 700 may be implemented in a continuous, parallel or discrete process.

A receiver protocol 800 is shown in FIG. 8. The receiver 300 (shown in FIG. 3) at 802 decodes the protocol code word with the indicator for the modulation (in the ISCH 603), which following the example above, is either 4-level modulation or 8-level modulation. It should be noted that although the indicator is shown as being provided as part of the ISCH 603, the indicator may also be provided on a trunking control channel. Alternatively, a varying synchronization pattern for different codes may be used. The protocol 800 then determines the modulation mode at 804. If a determination is made that the modulation is a 4-level modulation, then at 806 the receiver 300 is switched to 4-level mode, such that the receiver 300 uses a symbol time duration of 166.667 microseconds and a 4-level symbol map (shown columns 502 and 504 in FIG. 5). If a determination is made that the modulation is an 8-level modulation, then at 808 the receiver 300 is switched to an 8-level mode, such that the receiver 300 uses a symbol time duration of 250.000 microseconds and an 8-level map (shown columns 506 and 508 in FIG. 5). The protocol 800 then demodulates the TDMA burst at 810 based on the mode of operation. This protocol 800 then may be repeated. It should be noted that the protocol 800 may be implemented in a continuous, parallel or discrete process.

Thus, a method is provided for stretching the pulse width of a simulcast signal so that the delay spread is increased, thereby resulting in improved system coverage and delivered audio quality. Dynamic switching between 4-level modulation and 8-level modulation also may be provided. The same bit rate is maintained when switching from a four level signal system such as QPSK to an eight level signal system such as 8PSK. The switching may be controlled using a signal protocol to coordinate the transition in a TDMA system.

It should be noted that the various embodiments are not limited to communicating at the bit rates or the frequency spacing of the channels described herein. For example, the various embodiments may be modified to communicate at other channel frequency spacings, for example, 25 kHz and at a scaled bit rate, such as, 24 kbps (e.g., doubled to scale).

The various embodiments may be implemented in hardware, software, or a combination thereof. The various embodiments and/or components, for example, the transmitter or receiver, or components or controllers therein, also may be implemented as part of one or more computers or processors, which may be separate from or integrated with the battery charger or charge monitor. The computer or processor may include a computing device, an input device, a display unit and an interface, for example, for accessing the Internet. The computer or processor may also include a vocoder and a microphone or speaker together with analog to digital converters for processing audio information. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from its scope. While the specific components and processes described herein are intended to define the parameters of the various embodiments of the invention, they are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in meansplus-function format and are not intended to be interpreted based on 35 U.S.C. §112, sixth paragraph, unless and until such claim limitations expressly use the phrase "means for" followed by a statement of function void of further structure.

What is claimed is:

1. A method for simulcast communication, the method comprising:
   modulating a simulcast signal using 8-level modulation;
   increasing a time interval spacing between signal pulses of the simulcast signal;
   spreading in time the signal pulses of the simulcast signal; and
   communicating a stretched modulated simulcast signal formed by increasing the time interval spacing and spreading in time the signal pulses.

2. A method in accordance with claim 1 wherein the modulating comprises modulating the simulcast signal at a bit rate of one of 12 kilobits per second (kbps) and 9.6 kbps.

3. A method in accordance with claim 1 wherein the communicating comprises transmitting the stretched modulated simulcast signal using a Project 25 Time Division Multiple Access (TDMA) standard.

4. A method in accordance with claim 1 wherein the communicating comprises transmitting the stretched modulated simulcast signal using defined channel spaced of one of about 12.5 kilo-Hertz (kHz) apart and 25 kHz apart.

5. A method in accordance with claim 1 further comprising converting an input stream of data to 8-level symbols using three data bits.

6. A method in accordance with claim 5 wherein two most significant bits of the three data bits correspond to two bits of a phase shift level for 4-level mapping.

7. A method in accordance with claim 1 wherein the spreading in time comprises generating signal pulses having a Gaussian curve form.

8. A method in accordance with claim 1 wherein the 8-level modulation comprises one of 8 phase-shift keying (8PSK) modulation and harmonized differential quadrature phase shift keying (H-DQPSK) modulation.

9. A method in accordance with claim 1 wherein the increasing and spreading define a stretched eye pattern opening for the modulated simulcast signal.

10. A method in accordance with claim 1 further comprising encoding the stretched modulated simulcast signal with a protocol code word indicating the 8-level modulation.

11. A method in accordance with claim 10 wherein the encoding comprises using one of an inter-slot signaling channel and a trunking control channel to encode the protocol code.

12. A method in accordance with claim 1 wherein the spreading in time comprises spreading a symbol width of the simulcast signal or increasing a time duration between symbols relative to a time duration of symbols of a 4-level modulation.

13. A method for simulcast communication, the method comprising:
   selecting one of a 4-level modulation and an 8-level modulation for modulating a simulcast signal; and
   modulating the simulcast signal based on the selected modulation, wherein a bit rate for the simulcast signal is the same for different modulation types; and
   selecting said 8-level modulation to include generating a sequence of 8-level pulses, each having a pulse width that is larger than a pulse width of a 4-level pulse generated during said 4-level modulation.

14. A method for simulcast communication, the method comprising:
   selecting one of a 4-level modulation and an 8-level modulation for modulating a simulcast signal;
   modulating the simulcast signal based on the selected modulation, wherein a bit rate for the simulcast signal is the same for different modulation types;
   increasing a spacing between signal pulses of the simulcast signal, and
   spreading in time the pulse width of the simulcast signal when using the 8-level modulation.

15. A method in accordance with claim 13 further comprising dynamically switching between the 4-level modulation and the 8-level modulation based on the selected modulation.

16. A method in accordance with claim 13 further comprising using a signal protocol in the modulated simulcast signal to identify the selected modulation.

17. A method in accordance with claim 16 wherein the signal protocol is encoded in one of an inter-slot signaling channel and a trunking control channel.

18. A method in accordance with claim 13 wherein the 4-level modulation comprises one of compatible 4-level Frequency modulation (C4FM), quadrature phase-shift keying (QPSK) modulation and compatible Quadrature Phase Shift Keying (CQPSK) modulation, and wherein the 8-level modulation comprises one of 8 phase-shift keying (8PSK) modulation and harmonized differential quadrature phase shift keying (H-DQPSK) modulation.

19. A method in accordance with claim 13 further comprising communicating at one of a 9.6 kilobits per second (kbps) rate and a 12 kbps rate when using the 8-level modulation.

20. A simulcast communication system comprising:
   a transmitter configured to switch between a 4-level modulation mode and an 8-level modulation mode; and
   a receiver configured to switch between a 4-level modulation mode and an 8-level modulation mode based on an encoded signal protocol in a simulcast transmission from the transmitter;
   wherein said transmitter in said 8-level modulation mode generates a sequence of 8-level pulses, each having a pulse width that is larger than a pulse width of a 4-level pulse generated when said transmitter operates in said 4-level modulation mode.

21. A simulcast communication system comprising:
   a transmitter configured to switch between a 4-level modulation mode and an 8-level modulation mode; and
   a receiver configured to switch between a 4-level modulation mode and an 8-level modulation mode based on an encoded signal protocol in a simulcast transmission from the transmitter;
   wherein the transmitter is further configured to (i) increase a spacing between signal pulses of the simulcast transmission and (ii) spread in time the pulse width of the simulcast transmission when using the 8-level modulation.

22. A simulcast communication system in accordance with claim 21 wherein the transmitter comprises a Gaussian impulse filter configured to perform the stretching.

23. A simulcast communication system in accordance with claim 20 wherein the 4-level modulation comprises one of compatible 4-level Frequency modulation (C4FM), quadrature phase-shift keying (QPSK) modulation and compatible Quadrature Phase Shift Keying (CQPSK) modulation, and wherein the 8-level modulation comprises one of 8 phase-shift keying (8PSK) modulation and harmonized differential quadrature phase shift keying (H-DQPSK) modulation.

24. A simulcast communication system in accordance with claim 20 communicating at a 9.6 kilobits per second (kbps) rate when using the 4-level modulation and at a 12 kbps rate when using the 8-level modulation.

25. A simulcast communication system in accordance with claim 20 wherein the transmitter comprises a first converter configured to convert two bits to a 4-level phase shift in the 4-level modulation mode and a second converter configured to convert three bits to an 8-level phase shift in the 8-level modulation mode.

26. A simulcast communication system in accordance with claim 20 wherein the receiver comprises a first converter configured to convert a 4-level phase shift to two bits in the 4-level modulation mode and a second converter configured to convert an 8-level phase shift to three bits in the 8-level modulation mode.

27. A method for simulcast communication, the method comprising:

generating a sequence of 4-level pulses in which adjacent pulses are spaced apart from each other a duration defined by a first time interval;

generating a sequence of 8-level pulses in which adjacent pulses are spaced apart from each other a duration defined by a second time interval, said second time interval larger than said first time interval; and increasing a pulse width of each said 8-level pulse by a predetermined amount so that a pulse width of each said 8-level pulse is larger than a pulse width of each said 4-level pulse.

* * * * *